United States Patent
R et al.

(10) Patent No.: US 9,261,371 B2
(45) Date of Patent: Feb. 16, 2016

(54) SYSTEM AND METHOD OF VOICE BASED PERSONALIZED INTERACTIVE EVACUATION GUIDANCE

(71) Applicant: Honeywell International Inc., Morristown, NJ (US)

(72) Inventors: Sasikumar S R, Salem (IN); Ranjith Kumar P, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/279,924

(22) Filed: May 16, 2014

(65) Prior Publication Data

US 2015/0330796 A1    Nov. 19, 2015

(51) Int. Cl.
*G01C 21/20*   (2006.01)

(52) U.S. Cl.
CPC .................... *G01C 21/206* (2013.01)

(58) Field of Classification Search
CPC ................................................ G01C 21/206
See application file for complete search history.

(56) References Cited

U.S. PATENT DOCUMENTS

| 8,989,053 B1* | 3/2015 | Skaaksrud et al. | 370/255 |
| 2007/0087756 A1* | 4/2007 | Hoffberg | 455/450 |
| 2009/0150156 A1* | 6/2009 | Kennewick et al. | 704/257 |
| 2012/0022776 A1* | 1/2012 | Razavilar | 701/200 |
| 2013/0147604 A1 | 6/2013 | Jones, Jr. et al. | |
| 2013/0169817 A1 | 7/2013 | Jones et al. | |

FOREIGN PATENT DOCUMENTS

| CN | 103157199 A | 6/2013 |
| CN | 202995948 U | 6/2013 |
| JP | 2008-234250 A | 10/2008 |
| KR | 10-2011-0081016 | 7/2011 |
| KR | 10-2012-0072838 A | 7/2012 |

OTHER PUBLICATIONS

English translation of abstract CN202995948 (U).
English translation of abstract CN103157199 (A).
English translation of abstract JP2008234250 (A).
English translation of abstract KR20110081016 (A).
English translation of abstract KR20120072838 (A).

* cited by examiner

*Primary Examiner* — James Trammell
*Assistant Examiner* — James E Stroud
(74) *Attorney, Agent, or Firm* — Husch Blackwell LLP

(57) ABSTRACT

Systems and methods of voice based personalized interactive evacuation guidance are provided. Some methods include receiving a notification about an occurrence of a predetermined event in a monitored region, responsive to receiving the notification, pairing with a fixed device in the monitored region, responsive to pairing with the fixed device, transmitting location identifying information to a remote wireless system, and receiving, from the remote wireless system, information identifying an optimal route from a current location. Some methods include receiving user input requesting an optimal route from location A to location B in a monitored region, transmitting the user input to the remote wireless system, and receiving, from the remote wireless system, information identifying the optimal route.

18 Claims, 8 Drawing Sheets

SYSTEM AND METHOD OF VOICE BASED PERSONALIZED INTERACTIVE EVACUATION GUIDANCE

FIELD

The present invention relates generally to evacuation guidance systems and methods. More particularly, the present invention relates to systems and methods of voice based personalized interactive evacuation guidance.

BACKGROUND

Known systems and methods for providing evacuation guidance to building occupants fail to provide personalized evacuation guidance to an individual when an undesired event, such as a fire, occurs. Instead, known systems and methods provide the same general evacuation guidance to all building occupants using a centralized and automated evacuation system. This can be inefficient and create panic as building occupants search for exit signs, fire extinguishers, call points, and the like. Indeed, exit signs that are part of known evacuation guidance systems may be inefficient during certain conditions, such as when smoke from a fire is dense and prevents occupants that are following these visual signs from seeing them.

Furthermore, known systems and methods for providing evacuation guidance lead building occupants to the same exit path regardless of crowds or lines, which can cause delays and ad-hoc evacuation. That is, known systems and methods are based on a static plan for all building occupants and lack efficiency in rerouting building occupants in real time when, for example, emergency situations develop in areas near or in a pre-defined exit path. Indeed, any rerouting can cause chaos because the change in route is for all building occupants and is not personalized for individuals.

Moreover, known systems and methods for providing evacuation guidance are not effective for physically challenged individuals who must rely on others for assistance in evacuation. Indeed, such physically challenged individuals may only realize a need for evacuation by looking to other individuals who have already started to evacuate. This can create panic.

When known systems and methods for providing evacuation guidance are employed, building occupants follow the evacuation path identified by the guidance system, even when a more efficient route from an individual's current location may be available. Indeed, an individual's current location is not identified to known systems and methods because known systems and methods provide only one way communication: from the guidance system to the individual. Accordingly, known systems and methods do not instruct an individual to the most familiar and/or safest exit route from his current location, even though such a route may be the optimal exit path.

In view of the above, there is a continuing, ongoing need for improved systems and methods for providing evacuation guidance.

DETAILED DESCRIPTION

Figure 1A:
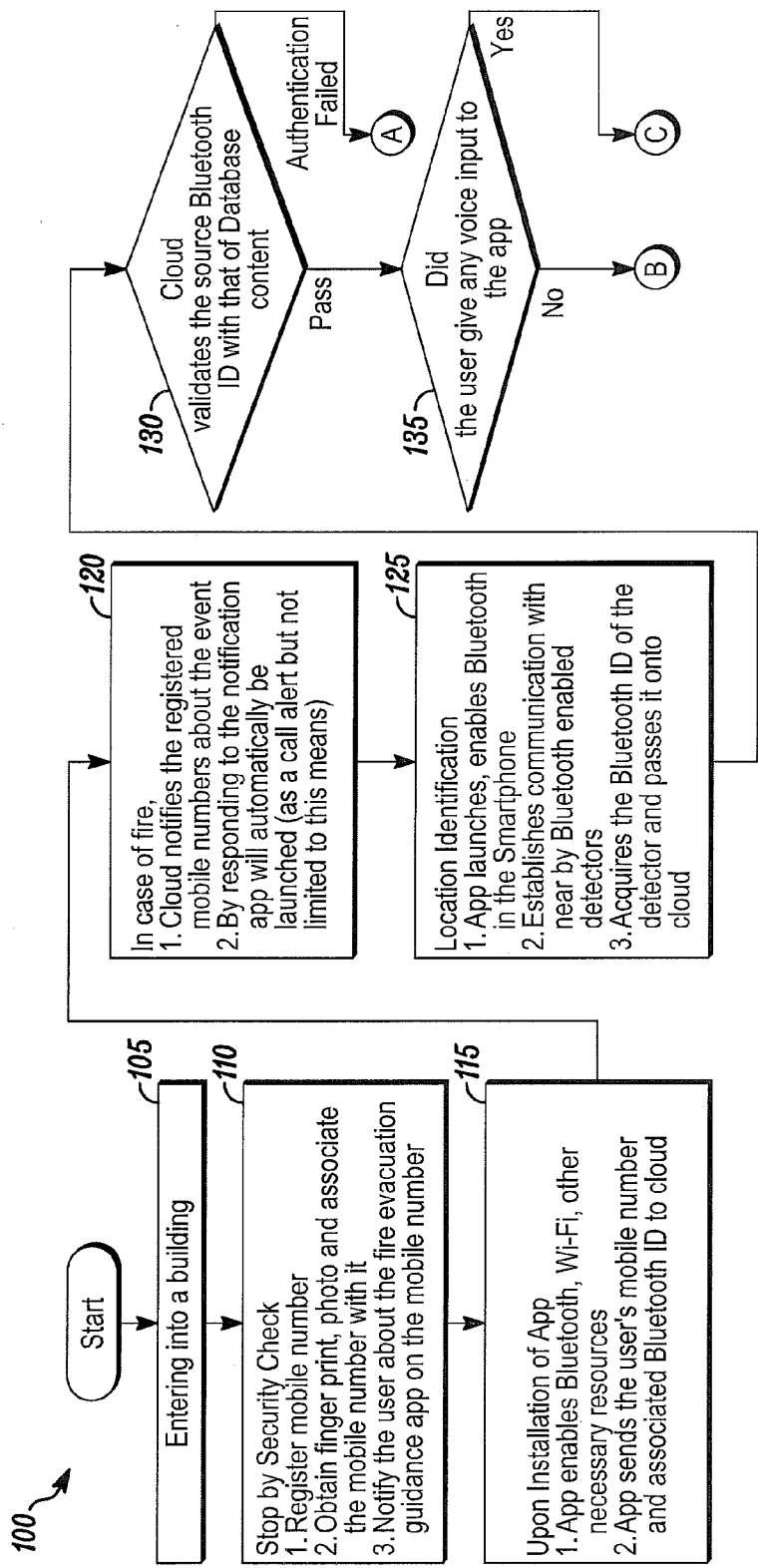
FIG. 1A is a flow diagram of a method in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods of voice based personalized interactive evacuation guidance. In some embodiments, systems and methods disclosed herein can include a voice based interactive evacuation guidance application and/or software running, for example, on a user's handheld device, such as a mobile device, a cellular telephone, a smart phone, a personal digital assistant, or the like. The user's handheld device can include a user interface, and the user can provide input via the interface with any one of voice, touch, gesture, and the like.

In some embodiments, systems and methods disclosed herein can receive user input for example, a voice command received by a user's handheld device. The voice command can include a request for an optimal route to reach a desired destination from a specific location. That is, the user can specify the starting location and the ending location of the requested route. For example, the user input can include a request for an exit route from the user's current location. The user input can also include a request for an exit route from another location. Accordingly, in some embodiments, any system output responsive to the user's request can facilitate the user guiding another user who may not have access to the systems and methods disclosed herein.

The user input can also include a request for an optimal and/or safe route to reach an extinguisher, a call point, a stair case, or any other configurable element in a monitored region, such as a building, from the user's current location or from another location. Accordingly, in some embodiments, a user can request assistance in reaching a particular type of extinguisher to extinguish a particular type of fire. For example, when a user needs a carbon dioxide extinguisher to extinguish a fire caused by an electrical short circuit, a user can provide as input a voice command such as "Where is carbon dioxide extinguisher?" or "Need to extinguish an electrical fire." to request assistance in reaching a carbon dioxide extinguisher.

Responsive to the user input, for example, the voice command and/or request, systems and methods disclosed herein can generate and display the requested route or path, and/or a map displaying the requested route or path. For example, in some embodiments, systems and methods disclosed herein can graphically display the requested route or path on a map of a monitored region displayed on a user interface, for example, a graphical user interface, of the user's handheld device.

In some embodiments, systems and methods disclosed herein can generate and provide instructions to an individual user to evacuate the monitored region via a shortest and/or best possible exit route from the user's current location. For example, in some embodiments, systems and methods disclosed herein can display a real time map of the monitored region, for example, on the user's handheld device. In some embodiments, the real time map of the monitored region and/or route for an individual to traverse can be generated by a remote wireless system, for example, a cloud network, that can transmit the instructions, map, and/or route to the user's device.

In some embodiments, the real time map can display representations of walkways in the monitored region, and systems and methods disclosed herein can update walkway information on a real time basis to indicate any obstructions or other events occurring on or near each walkway. For example, when systems and methods disclosed herein generate and display a first evacuation path on the real time map of the monitored region, but subsequently identify a hazard and/or crowds along the first evacuation path, systems and methods can dynamically generate and display a second evacuation path on the real time map, where the second evacuation path avoids the identified hazard and/or crowds. Accordingly, systems and methods disclosed herein can dynamically reroute an individual who had been previously instructed to traverse the first evacuation path.

In some embodiments, systems and methods disclosed herein can base the generated routes, paths, and maps on many criteria, including, but not limited to, user input, including interactive user input, user movement within the monitored region, an optimal path from a user's location, real-time hazards on or near the path, the mobility rate of users, communication latency in the overall system, including reaction time to a real-time hazard, and the location of other users in the monitored region, including any crowds on or near an identified route or path. In some embodiments, responsive to an identified route or path, a user can provide input to request an alternative route or path.

In some embodiments, systems and methods disclosed herein can generate a real-time evacuation map and/or route for traversing a monitored region and provide the generated map and/or route to a first user's handheld device on behalf of a second user who may not have a handheld device that employs the systems and methods disclosed herein. In these embodiments, the first user can provide input to his handheld device regarding the second user's location via voice, touch, or any other input as would be known by those of skill in the art. The first user's handheld device can transmit the received input to a remote wireless system, for example, a cloud network, that includes a database of the monitored region and structural information associated therewith, such as the location of rooms, walls, stairwells, and the like. The remote wireless system can associate the location of the second user with information in the database and responsive thereto, generate an optimal map and/or route for the second user to traverse. Then, the remote wireless system can transmit the map and/or route to the first user's handheld device.

In some embodiments, systems and methods disclosed herein can generate and provide alarm and/or evacuation notification messages. For example, systems and methods can transmit to a user's handheld device a telephone call, a message alert, such as a text message, or any other notification means as would be known by those of skill in the art that includes information regarding an alarm and/or evacuation instructions.

In some embodiments, systems and methods can identify the location of individuals in the monitored region and provide individualized evacuation guidance in accordance with an individual's location. In these embodiments, user input may not be necessary for a user to receive individualized evacuation guidance. For example, in some embodiments, elements or devices of a building's fire protection system, such as detectors, output devices, and the like, can wirelessly communicate with a user's handheld device via short range wireless communication, including, but not limited to, Bluetooth, WiFi, and the like. To communicate with a user's handheld device, the short range wireless communication capability of system devices can be enabled. In some embodiments, the short range wireless communication capability of system devices and/or wireless modules in system devices that is used for location identification can be activated and/or enabled only upon the occurrence of a predetermined condition, such as fire event detection, in order to conserve the operating power of the system devices. Similarly, in some embodiments, systems and methods disclosed herein can enable the short range wireless communication capability of hardware and/or software in the user's handheld device, for example, responsive to receiving a message from a remote wireless system indicating the occurrence of a predetermined event. These embodiments can ensure that the hardware and/or software in the user's handheld device necessary for evacuation guidance is enabled when needed irrespective of a user's default settings and/or inadvertent disablement.

Upon activation and/or enablement of wireless communication capability in a system device and/or in a user's handheld device, a user's handheld device within a predetermined distance from the system device can pair and/or associate with the system device. Once paired, the user device can transmit location identifying information to systems and methods disclosed herein and/or to a wireless system as disclosed herein, for example, a cloud network. Then, systems and methods disclosed herein can provide an evacuation route, map, or instructions to the user's handheld device instructing the user how to best evacuate the monitored region from his current location.

In some embodiments, the location identifying information can include information that defines the location of a user's device relative to system devices, including a system device with which a user device is paired. As the user device traverses a monitored region, the user device can pair with other system devices and transmit updated location identifying information in accordance with each new pairing. Accordingly, when the wireless system and/or systems and methods disclosed herein receive new location identifying information, the wireless system and/or systems and methods disclosed herein can dynamically update instructions and/or routes, paths, and maps provided to the user device.

When systems and methods disclosed herein detect a failure in a system device or a wireless module of a system device, some systems and methods can transmit a message to a user's handheld device instructing the user to move so that the user's handheld device can associate and/or pair with a different system device and location identifying information can be obtained.

In accordance with embodiments disclosed herein, systems and methods can provide evacuation guidance to physically challenged individuals. For example, a physically challenged individual's user device can display a graphical representation of a floor map, in real time, and/or provide audible voice commands for step by step evacuation guidance. When a physically challenged individual is confined to a wheelchair, systems and methods disclosed herein can provide evacuation guidance that directs the individual to use only wheelchair-accessible routes.

In some embodiments, information generated and/or received by systems and methods disclosed herein, including the real-time location of building occupants, the mobility rate of building occupants, and/or the real-time hazards in the building, can be provided to third party users, for example, administrators, security personnel, and the like. In some embodiments, certain third party users can have authority for configuring system devices and/or objects in the building.

In some embodiments, systems and methods disclosed herein can transmit a message to a user's handheld device in a monitored region to confirm the user's status and/or condition. In some embodiments, systems and methods can request such a beacon message after an absence of communication from the handheld device for a predetermined period of time.

Figure 1B:
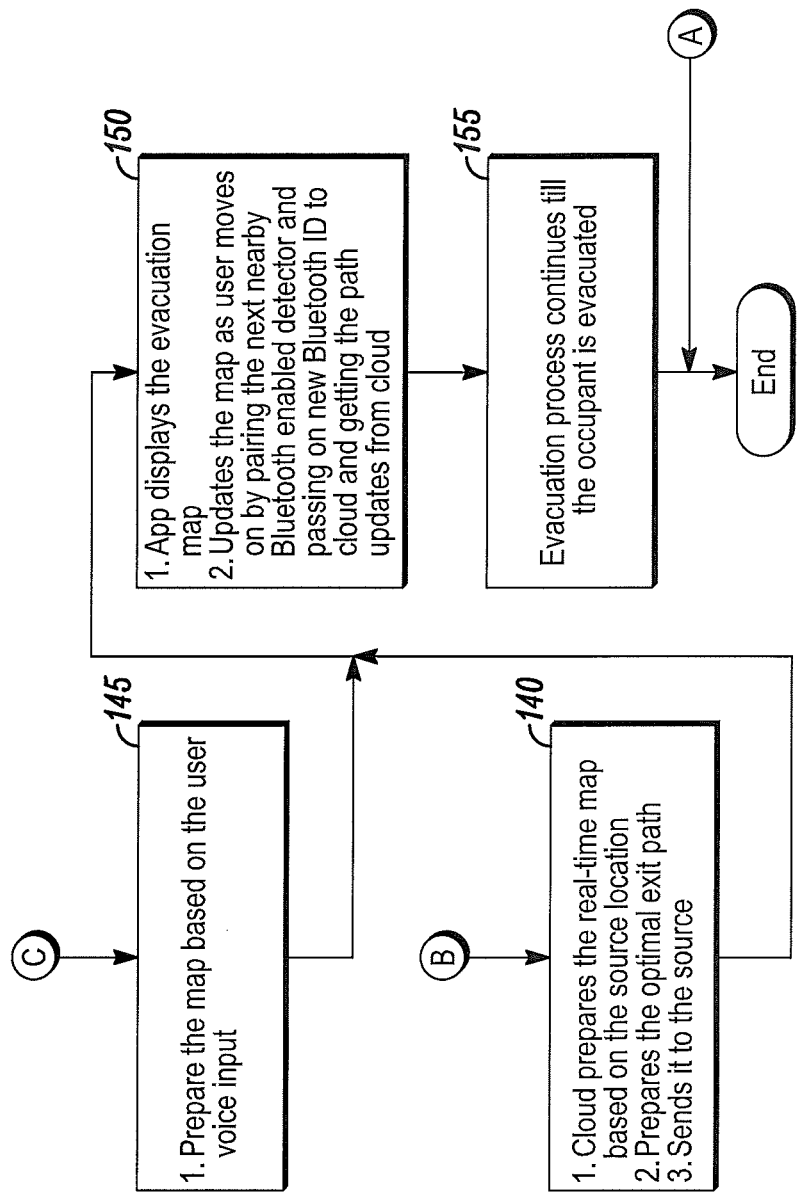
FIG. 1B is a continuation of the flow diagram shown in FIG. 1A.

FIG. 1 is a flow diagram of a method 100 in accordance with disclosed embodiments. As seen in FIG. 1, a user carrying a handheld device, such as a smart phone, a personal digital assistant, or the like, can enter a monitored region, such as a building, as in 105. During a security check, the method 100 can install a software application in accordance with systems and methods disclosed herein on the user's handheld device as in 110. In some embodiments, installing the software application as in 110 can include registering the mobile number of the user's handheld device, obtaining a fingerprint and/or photo of the user and associating the number of the user's handheld device with the fingerprint and/or photo of the user, and/or notifying the user, via the user's handheld device, about the installed software application.

Upon installation of the software application as in 110, the method 100 can enable short range wireless communication capabilities of the user's handheld device, for example, Bluetooth, WiFi, or the like, and transmit the user's mobile number and/or an associated short range wireless communication identification number to a remote wireless system, for example, a cloud network as in 115.

Upon detection of a fire event or condition as in 120, the method 100 can transmit a message to the user's handheld device notifying the user about the event and responsive thereto, the previously installed software application can be automatically launched. Upon launch of the software application as in 125, the method 100 can enable short range wireless communication capabilities of the user's handheld device, for example, Bluetooth, WiFi, or the like, establish communication with system devices, such as a detector, within a predetermined distance from the user's handheld device, acquire the short range wireless communication identification number of the nearby system devices, and transmit such identification numbers to a remote wireless system, for example, a cloud network.

As seen in FIG. 1, the method 100 can include the remote wireless system authenticating and/or validating the source of the short range wireless communication identification number by cross-referencing the identification number with content stored in a database and/or memory device as in 130. If the authentication fails, then the method 100 can proceed to step A, and the method 100 can terminate. However, if the validation passes, then the method 100 can determine whether the user's handheld device received any user input, for example, a voice command as in 135. If not, then the method 100 can proceed to step B. However, if the user's handheld device did receive user input, then the method 100 can proceed to step C.

As seen in FIG. 1, when the method 100 proceeds to step B, the method 100 can include the remote wireless system, for example, a cloud network, preparing a real-time map of the monitored region based on the location of the user's handheld device, preparing an optimal exit route from the location of the user's handheld device, and transmitting the optimal exit route to the user's handheld device as in 140. For example, the method 100 can determine the location of the user's handheld device based on the short range wireless communication identification number of system devices, as well as the location of those devices, that are within a predetermined distance of the user's handheld device.

As seen in FIG. 1, when the method 100 proceeds to step C, the method 100 can include the remote wireless system, for example, a cloud network, preparing a real-time map of the monitored region based on the user input, for example, the received voice command, preparing a route based on the user input, and transmitting the prepared route to the user's handheld device as in 145.

After the method 100 transmits the optimal exit route based on the location of the user's handheld device as in 140 or transmits the route prepared based on the user input as in 145, the method 100 can include displaying a real-time map on the user's handheld device, with the prepared route(s), and updating the map as appropriate as in 150. For example, the method 100 can update the displayed map as the user moves throughout the monitored region and communicates and/or pairs with system devices within a predetermined distance from the user's handheld device. In some embodiments, when the user's handheld device communicates and/or pairs with a new system device, the handheld device can transmit the short range wireless communication identification number of the new system device to the cloud network, the cloud network can update the prepared route responsive thereto, and the cloud network can transmit the updated route to the user's handheld device for displaying thereon. Then, the evacuation process can continue as in 155 until the user is evacuated from the monitored region and/or reaches his desired destination within the monitored region.

Figure 2:
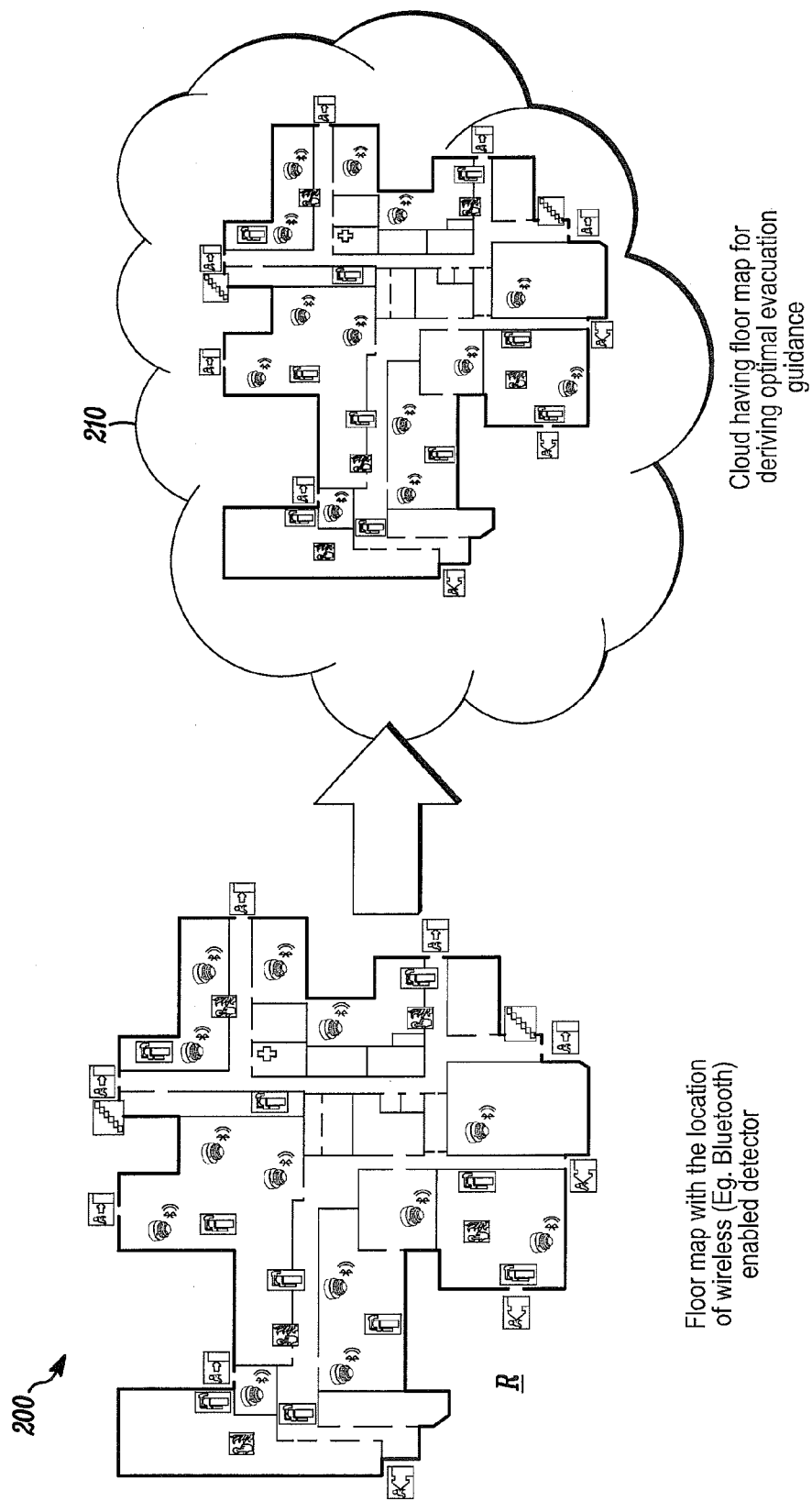
FIG. 2 is a diagram of a floor plan of a monitored region in accordance with disclosed embodiments.

FIG. 2 is a diagram of a floor plan 200 of a monitored region R in accordance with disclosed embodiments. As seen in FIG. 2, the floor plan 200 can display the location of system devices in the monitored region, for example, detectors, output devices, and the like, that can wirelessly communicate with a user's handheld device via short range wireless communication, including, but not limited to, Bluetooth and the like. The floor plan 200 can be transmitted to a remote wireless system, for example, a cloud network 210, which can determine optimal evacuation guidance and/or paths to traverse in the monitored region R.

Figure 3:
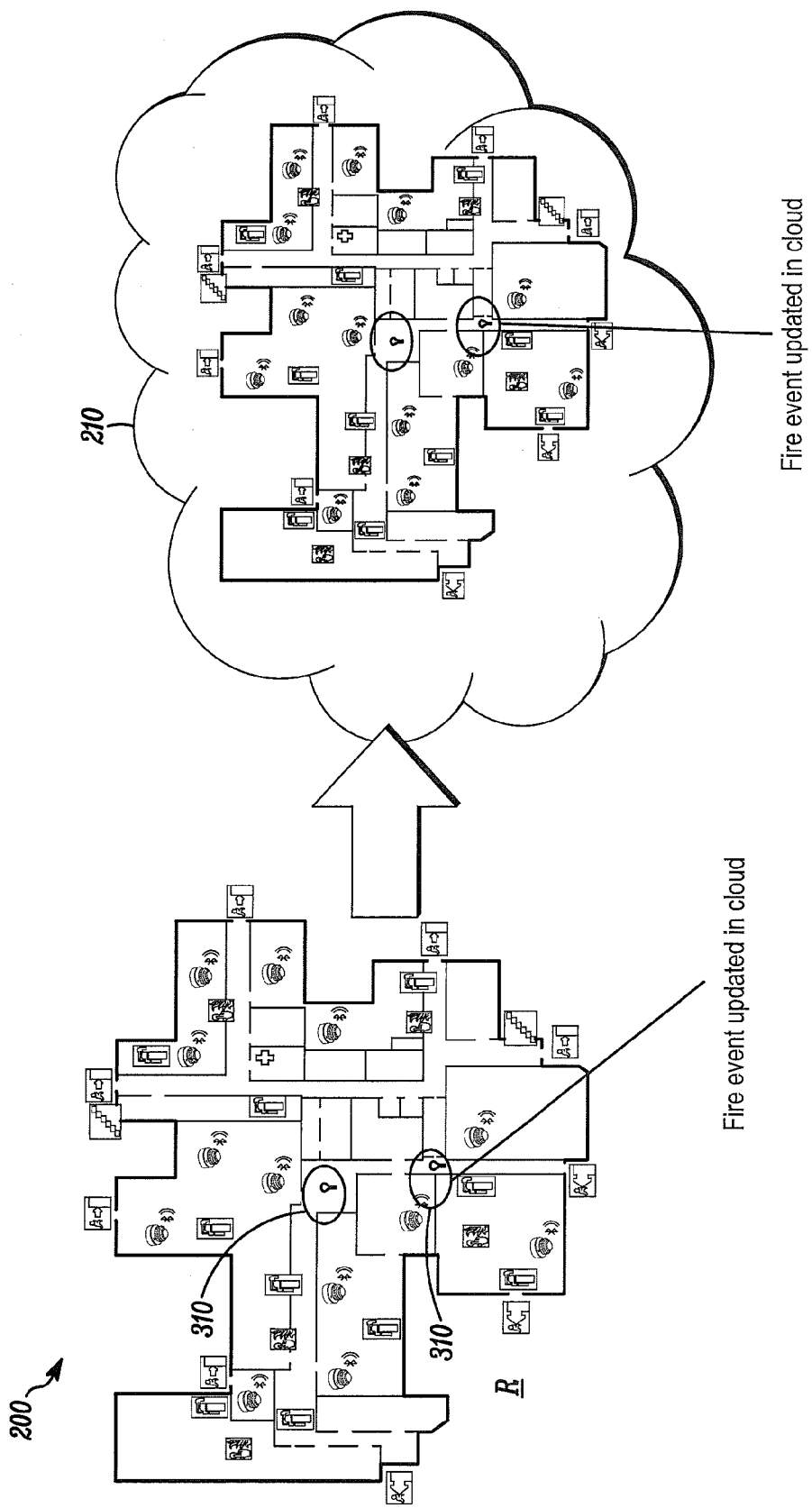
FIG. 3 is a diagram of a floor plan of a monitored region when a fire event or condition has been detected in the region in accordance with disclosed embodiments.

FIG. 3 is a diagram of the floor plan 200 of the monitored region R when a fire event or condition 310 has been detected in the region R in accordance with disclosed embodiments. As seen in FIG. 3, when the fire event 310 is detected, the fire event 310 can be transmitted to the cloud network 210, and the floor plan stored therein can be updated accordingly.

Figure 4:
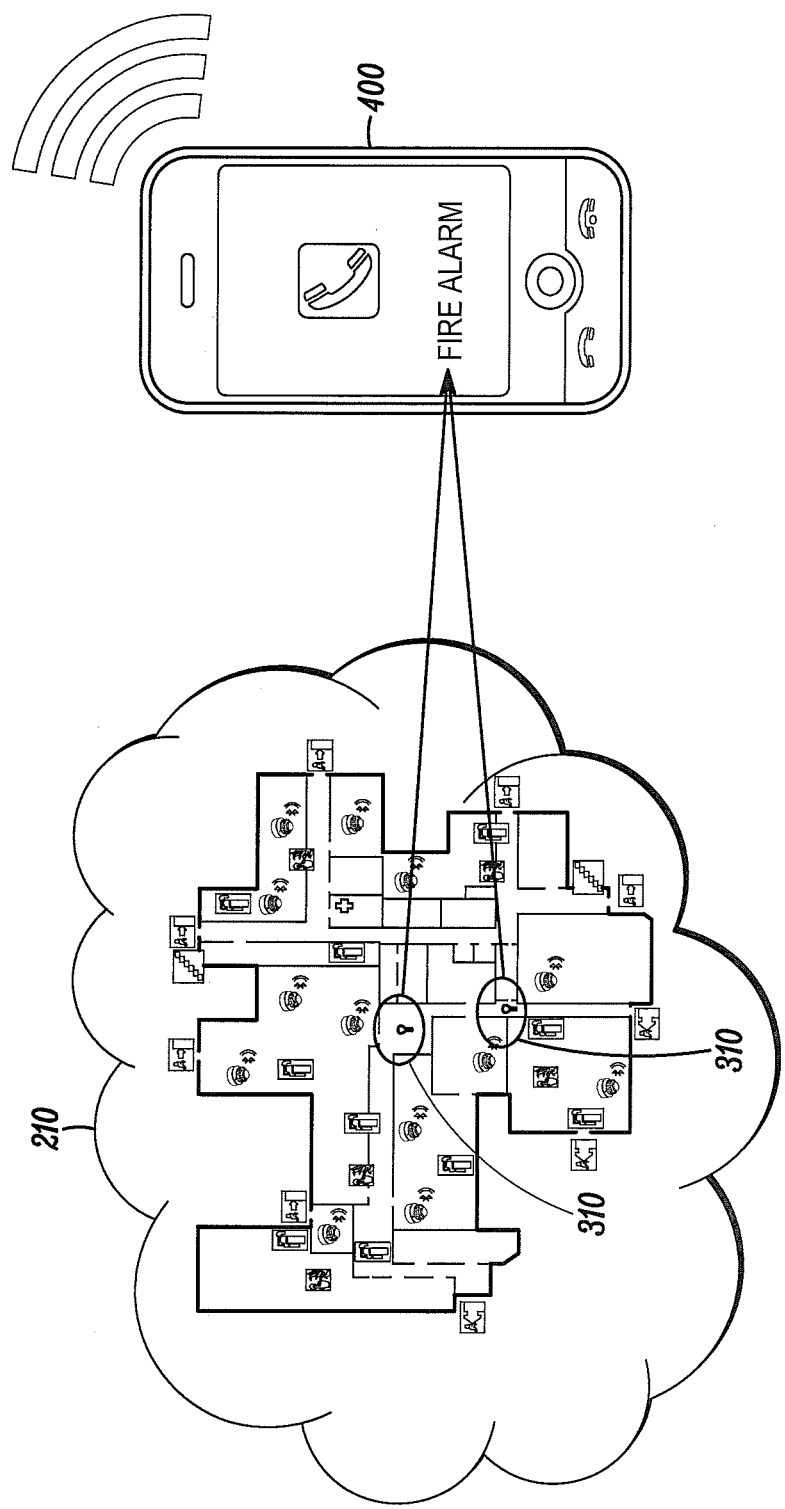
FIG. 4 is a diagram of a cloud network transmitting a notification message to a user's handheld device in accordance with disclosed embodiments.

FIG. 4 is a diagram of the cloud network 210 transmitting a notification message to the user's handheld device 400 in accordance with disclosed embodiments. For example, the notification message can include information about the detected fire event 310.

Figure 5:
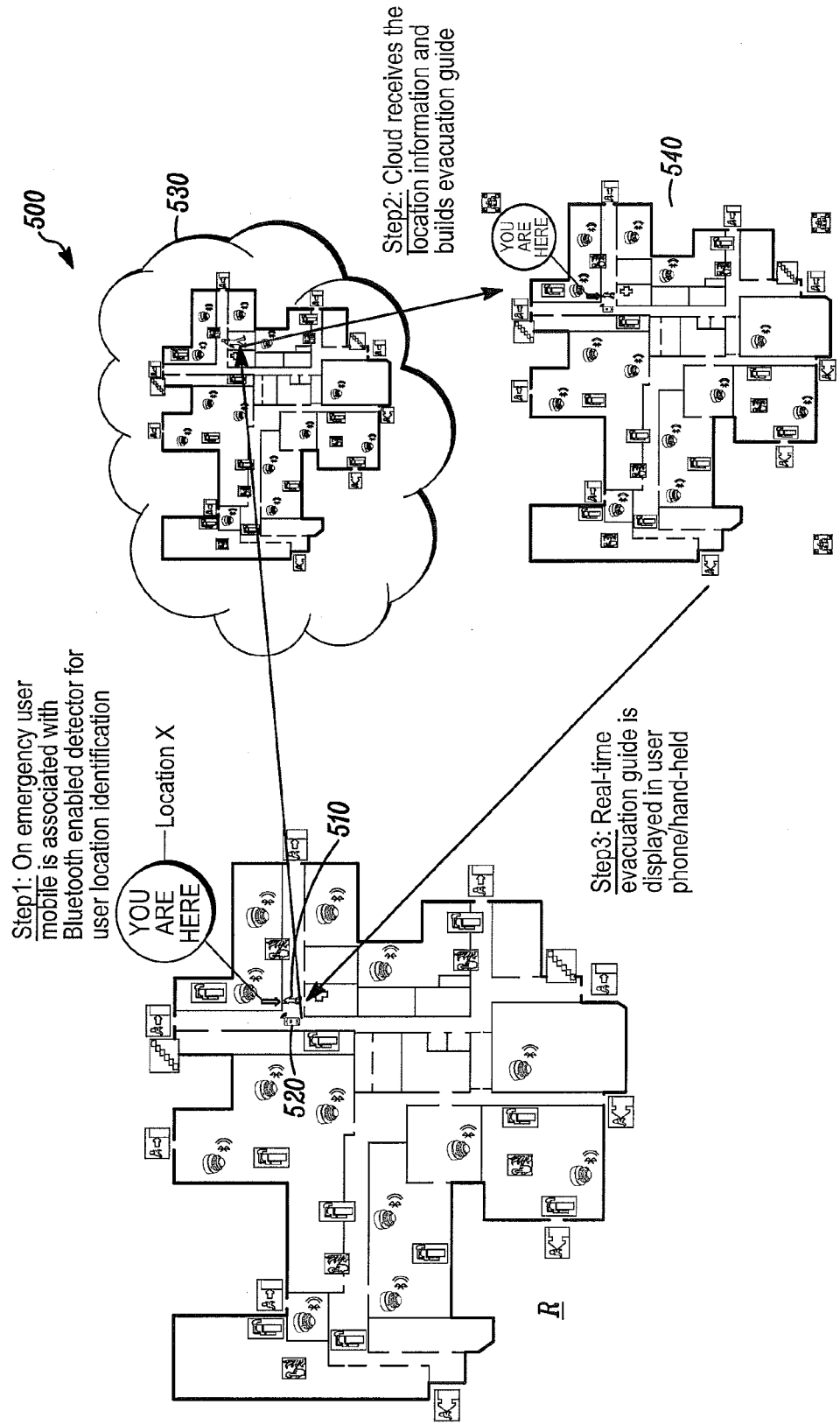
FIG. 5 is an illustrated flow diagram of a method in accordance with disclosed embodiments.

FIG. 5 is an illustrated flow diagram of a method 500 in accordance with disclosed embodiments. As seen in FIG. 5, a user and his handheld device 510 can be at location X in a monitored region R. Upon detection of an emergency condition, the user's handheld device 510 can associate and/or pair with a system device 520 within a predetermined distance from the handheld device, for example a detector, output device, or the like, that can wirelessly communicate with the handheld device 510 via short range wireless communication, including, but not limited to, Bluetooth and the like. In some embodiments, the short range wireless communication identification number of the paired system device can be location identifying information because associating and/or pairing the handheld device 510 with the system device 520 allows for detection of the user's location via the known location of the system device 520.

The user's handheld device 510 can transmit the location identifying information to a remote wireless system 530, for example, a cloud network, which can use the location identifying information, information relating to the emergency condition, including the location thereof, and any user input or voice command to dynamically generate, in real-time, a map 540 that includes a guidance path or route for the user in the monitored region. In some embodiments, the guidance path can include an evacuation path.

The remote wireless system 530 can transmit the generated map 540, with the guidance path, to the handheld device 510 for displaying thereon.

Figure 6:
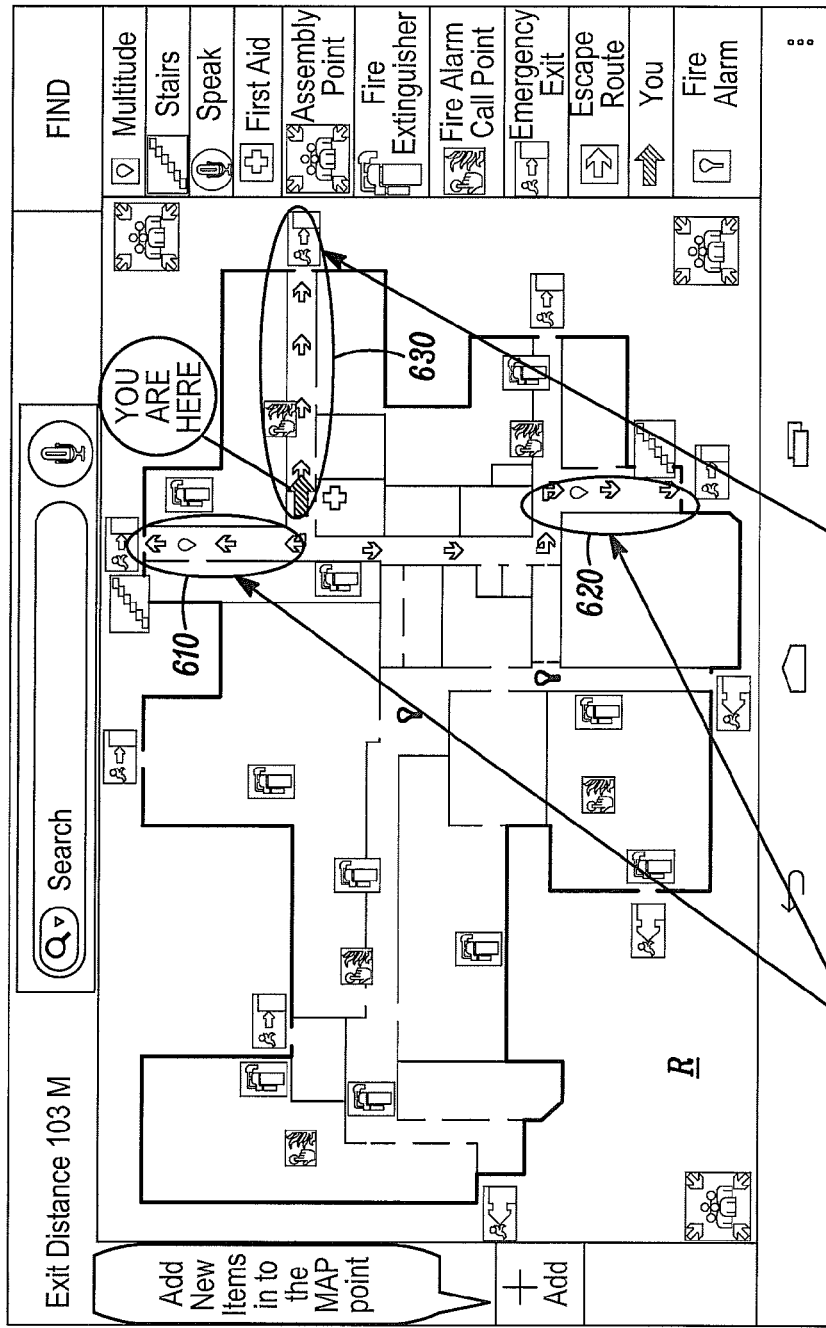
FIG. 6 is a diagram of a user interface displayed on a user's handheld device in accordance with disclosed embodiments.

FIG. 6 is a diagram of a user interface 600 displayed on a user's handheld device in accordance with disclosed embodiments. In some embodiments, the user interface 600 can be generated by a software application running on the handheld device and/or by a remote wireless system/cloud network. As seen in FIG. 6, the user interface 600 can display a floor plan of a monitored region R.

The user can provide user input, via the user interface 600, to request a safest and/or optimal exit path and/or a path to a configuration device in the monitored region R, such as an extinguisher, call point, or the like. In some embodiments, systems and methods disclosed herein can generate a plurality of paths responsive to the user input, and each of the paths can be displayed on the user interface 600. For example, the plurality of generated paths can include paths 610, 620 nearest to a user's location X in the monitored region R. However, systems and methods disclosed herein can determine, for example, that paths 610, 620 are overcrowded with other users in the region R. Accordingly, the plurality of generated paths can also include path 630, which may be the most optimal path for the user to traverse under current conditions.

Figure 7:
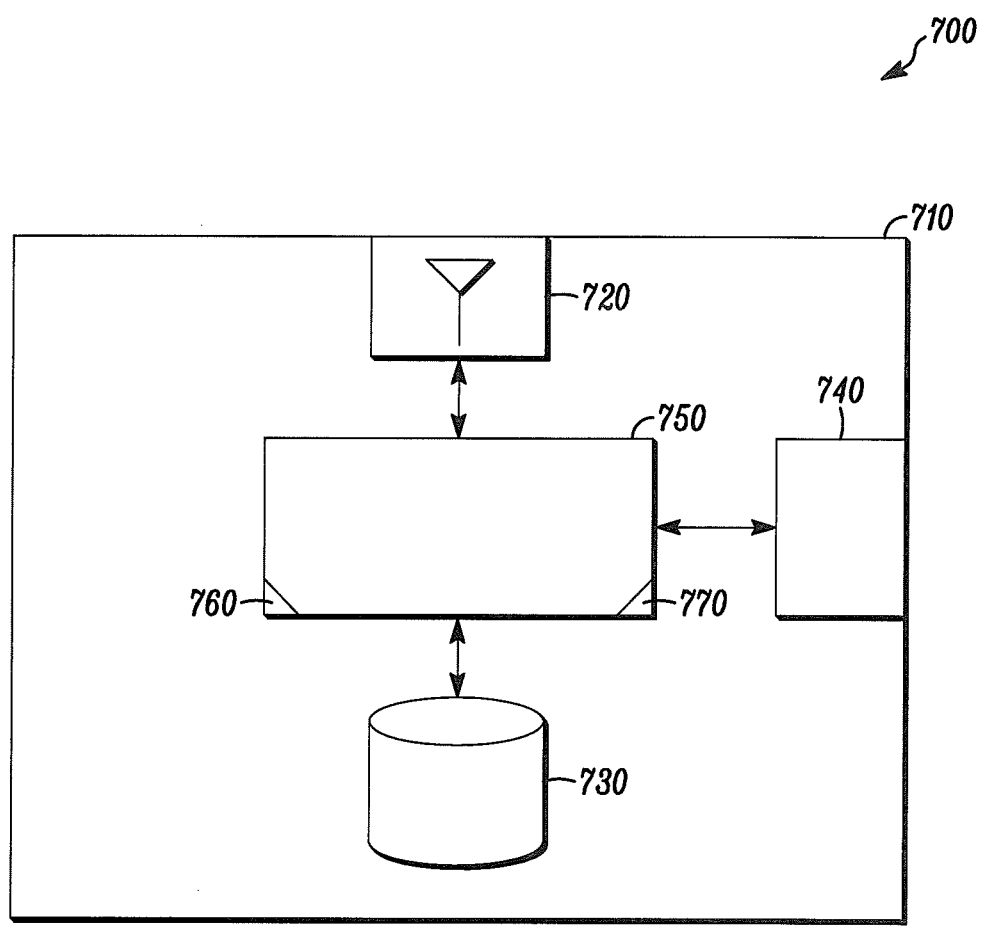
FIG. 7 is a block diagram of a system in accordance with disclosed embodiments.

FIG. 7 is a block diagram of a system 700 in accordance with disclosed embodiments. As seen in FIG. 7, the system 700 can include a housing 710, a transceiver and/or radio 720, a memory device 730, a user interface 740, control circuitry 750, one or more programmable processors 760, and executable control software 770 as would be understood by those or ordinary skill in the art. The executable control software 770 can be stored on a transitory or non-transitory local computer readable medium, including, but not limited to, local computer memory, RAM, optical storage media, magnetic storage media, flash memory, and the like. In some embodiments, the control circuitry 750, the programmable processors 760, and/or the control software 770 can execute and control the methods described above.

In some embodiments, the system 700 can include a user's handheld device running the software application as disclosed herein. In some embodiments, the system 700 can include a remote wireless system, for example, the cloud network as disclosed herein.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A method comprising:
   a user device receiving a notification about an occurrence of a predetermined event in a monitored region;
   responsive to the user device receiving the notification, the user device pairing with a fixed device in the monitored region;
   responsive to the user device pairing with the fixed device, the user device receiving an identification number of the fixed device;
   responsive to the user device receiving the identification number of the fixed device, the user device transmitting location identifying information to a remote wireless system; and
   responsive to the user device transmitting the location identifying information to the remote wireless system, the user device receiving, from the remote wireless system, information identifying an optimal route from a current location,
   wherein the location identifying information includes the identification number of the fixed device.

2. The method of claim 1 wherein receiving the notification about the occurrence of the predetermined event in the monitored region includes receiving the notification from the remote wireless system.

3. The method of claim 1 wherein pairing with the fixed device in the monitored region includes pairing with a fixed device within a predetermined distance.

4. The method of claim 1 wherein pairing with the fixed device in the monitored region includes pairing, via short range wireless communication, with the fixed device in the monitored region.

5. The method of claim 1 further comprising displaying the information identifying the optimal route on a user interface.

6. The method of claim 5 wherein displaying the information identifying the optimal route includes displaying a real-time map of the monitored region and identifying the optimal route on the real-time map.

7. The method of claim 1 further comprising, upon user movement within the monitored region, pairing with a second fixed device in the monitored region, and transmitting updated location identifying information to the remote wireless system.

8. The method of claim 1 further comprising, upon occurrence of a second event in the monitored region, receiving, from the remote wireless system, information identifying an updated optimal route.

9. A method comprising:
   a user device receiving a notification about an occurrence of a predetermined event in a monitored region;
   responsive to the user device receiving the notification, the user device pairing with a fixed device in the monitored region;
   responsive to the user device pairing with the fixed device, the user device receiving an identification number of the fixed device;
   the user device receiving user input requesting an optimal route from location A to location B in a monitored region;

responsive to the user device receiving the user input, the user device transmitting the user input to the remote wireless system; and responsive to the user device transmitting the user input, the user device receiving, from the remote wireless system, information identifying the optimal route, wherein when location A includes a user's current location, the user device transmits location identifying information to the remote wireless system, and wherein the location identifying information includes the identification number of the fixed device.

10. The method of claim 9 wherein receiving the user input includes receiving the user input via at least one of a voice command, a touch of a user interface, or a gesture identified by the user interface, and wherein the at least one of the voice command, the touch, or the gesture requests the optimal route from location A to location B in the monitored region.

11. The method of claim 9 wherein location A includes the user's current location or a second user's current location.

12. The method of claim 9 wherein location B includes an exit of the monitored region, a location in the monitored region other than the user's current location in the monitored region, or a configurable element in the monitored region.

13. The method of claim 9 further comprising displaying the information identifying the optimal route on a user interface.

14. The method of claim 13 wherein displaying the information identifying the optimal route includes displaying a real-time map of the monitored region and identifying the optimal route on the real-time map.

15. The method of claim 9 further comprising, upon an occurrence of an event in the monitored region, receiving, from the remote wireless system, information identifying an updated optimal route from location A to location B in the monitored region.

16. A method comprising:

responsive to an occurrence of a predetermined event in a monitored region, causing a fixed device in the monitored region to pair with a user device in the monitored region;

responsive to the fixed device pairing with the user device, causing the fixed device to transmit an identification number of the fixed device to the user device;

the fixed device receiving, from the user device, a request for an optimal route from location A to location B in the monitored region;

determining the optimal route from location A to location B in the monitored region; and transmitting information identifying the optimal route to the user device, wherein when location A includes a user's current location, the request includes location identifying information, and wherein the location identifying information includes the identification number of the fixed device.

17. The method of claim 16 wherein receiving, from the user device, the request for the optimal route from location A to location B in the monitored region includes receiving, from the user device, a voice command requesting the optimal route from location A to location B in the monitored region.

18. The method of claim 16 wherein determining the optimal route includes:

receiving information regarding real-time hazards within the monitored region or information regarding a location of a plurality of users in the monitored region; and responsive thereto, determining the optimal path, wherein the optimal path avoids the real-time hazards within the monitored region or avoids a predetermined number of the plurality of users.

* * * * *